(12) United States Patent
Morioka

(10) Patent No.: US 7,728,824 B2
(45) Date of Patent: Jun. 1, 2010

(54) DISPLAY DEVICE, INPUT DEVICE, PRINTING DEVICE, AND ELECTRIC DEVICE

(75) Inventor: Hirohito Morioka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 793 days.

(21) Appl. No.: 11/699,511

(22) Filed: Jan. 30, 2007

(65) Prior Publication Data

US 2007/0195064 A1 Aug. 23, 2007

(30) Foreign Application Priority Data

Feb. 22, 2006 (JP) ............... 2006-045844
Feb. 22, 2006 (JP) ............... 2006-045845

(51) Int. Cl.
*G06F 3/041* (2006.01)

(52) U.S. Cl. .............. 345/173; 345/1.3; 345/169; 345/9; 355/44; 355/45; 348/14.03; 348/14.07

(58) Field of Classification Search .......... 345/1.3, 345/2, 7, 9, 169, 173, 32; 355/44, 45; 348/14.03, 348/14.07
See application file for complete search history.

(56) References Cited

U.S. PATENT DOCUMENTS

| 5,950,045 | A | 9/1999 | Nomura et al. |
| 6,295,117 | B2 * | 9/2001 | Haraguchi et al. ............ 355/40 |
| 7,369,100 | B2 * | 5/2008 | Zacks et al. ............... 345/1.3 |
| 7,557,800 | B2 * | 7/2009 | Yanagisawa ............... 345/173 |
| 2003/0006943 | A1 * | 1/2003 | Sato et al. .................. 345/9 |
| 2003/0063341 | A1 | 4/2003 | Thomason et al. |
| 2005/0007298 | A1 | 1/2005 | Sato et al. |
| 2005/0156814 | A1 | 7/2005 | Sato et al. |
| 2006/0087710 | A1 | 4/2006 | Thomason et al. |

FOREIGN PATENT DOCUMENTS

| GB | 2405489A A | 3/2005 |
| JP | 9-37193 A | 2/1997 |
| JP | 10-124240 A | 5/1998 |
| JP | 2004-233816 A | 8/2004 |
| JP | 2005-504356 A | 2/2005 |
| JP | 2005-77936 A | 3/2005 |
| JP | 2005-78076 A | 3/2005 |
| JP | 2005-84299 A | 3/2005 |
| JP | 2005-284592 A | 10/2005 |
| WO | WO-01/59749 A1 | 8/2001 |

* cited by examiner

Primary Examiner—Richard Hjerpe
Assistant Examiner—Sahlu Okebato
(74) Attorney, Agent, or Firm—Birch, Stewart, Kolasch & Birch, LLP

(57) ABSTRACT

A display device or an input device includes: a display section for simultaneously displaying (i) a first image in a first direction and (ii) a second image, which is different from the first image, in a second direction different from the first direction; and a reflecting section. The reflecting section reflects the second image, which is displayed on the display section, toward a viewing position where the first image is viewable and recognizable. This allows a user to simultaneously view (i) the first image displayed in the first direction by the display device or the input device and (ii) the second image displayed in the second direction by the display device or the input device.

8 Claims, 14 Drawing Sheets

FIG. 9 (a)
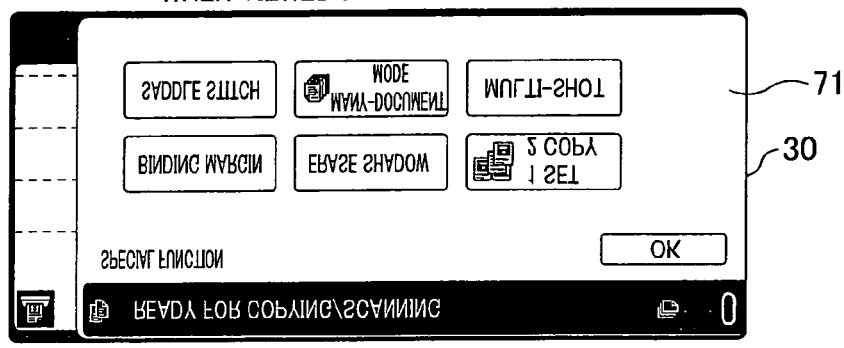
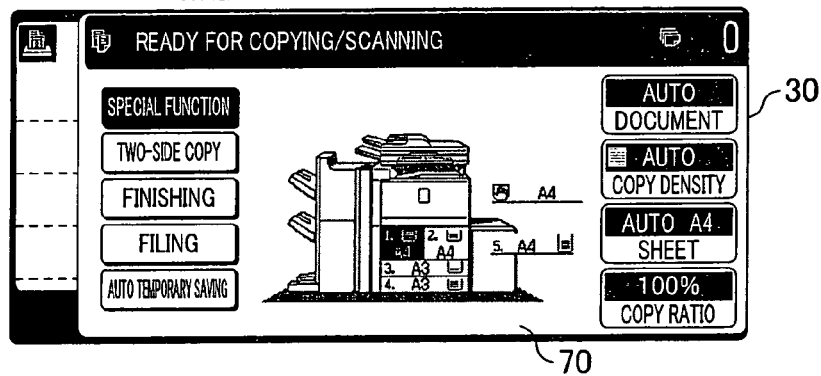
FIG. 9 (b)
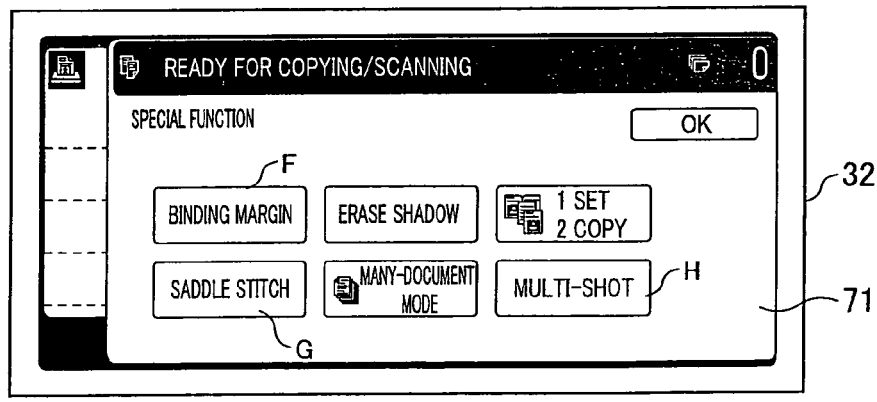
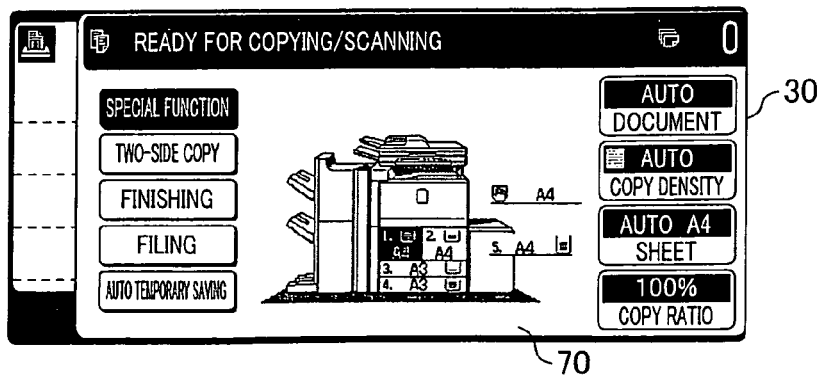

FIG. 10 (a)
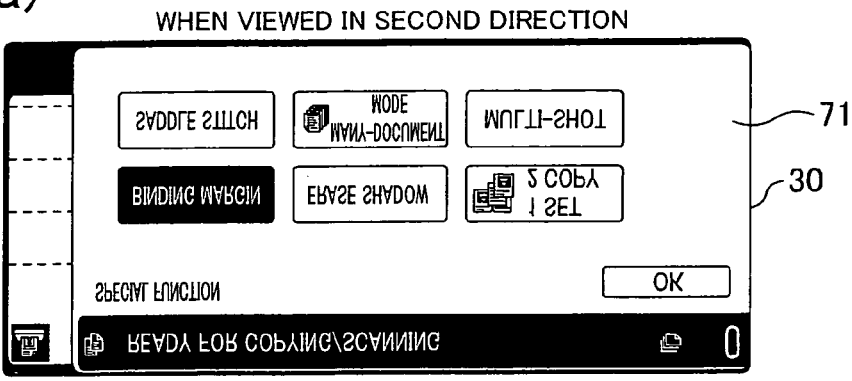
WHEN VIEWED IN SECOND DIRECTION
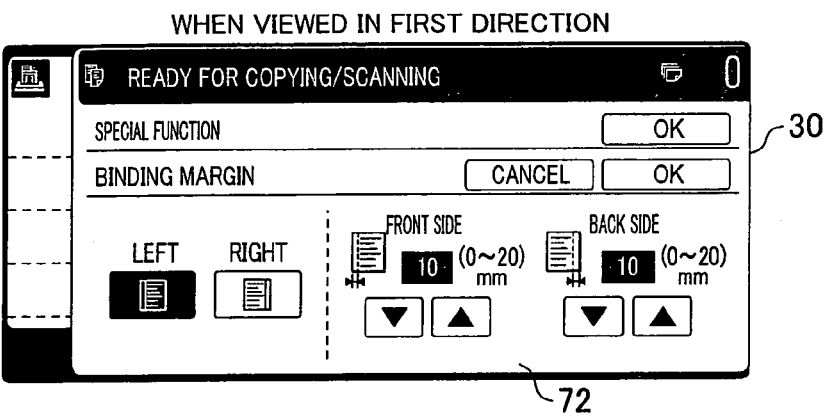
WHEN VIEWED IN FIRST DIRECTION
FIG. 10 (b)
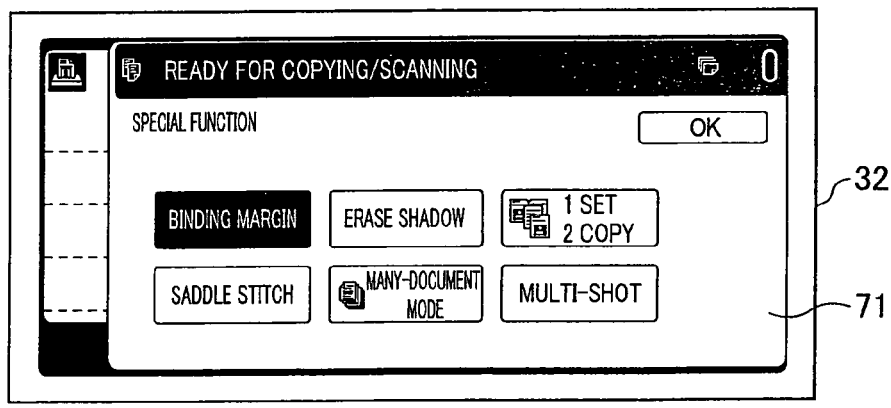
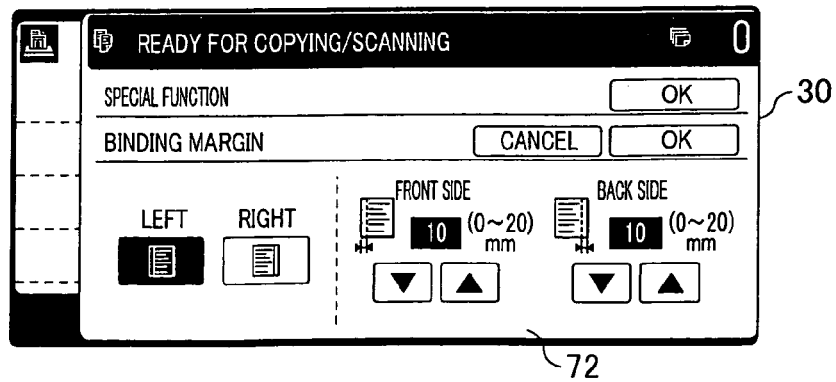

FIG. 11
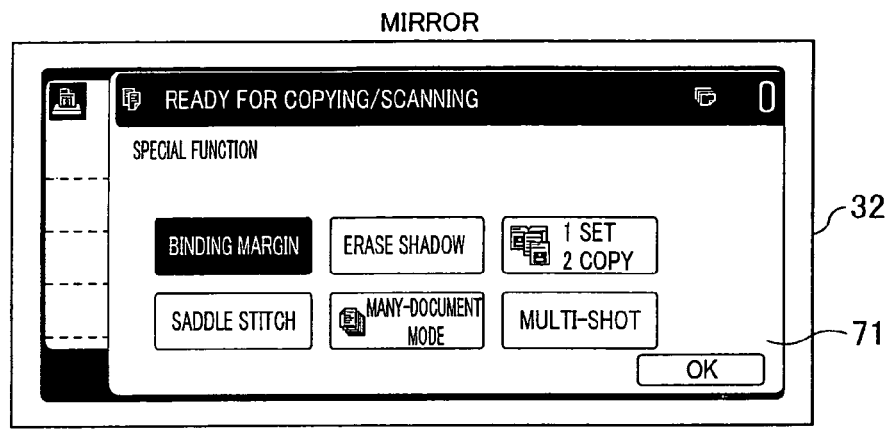
MIRROR
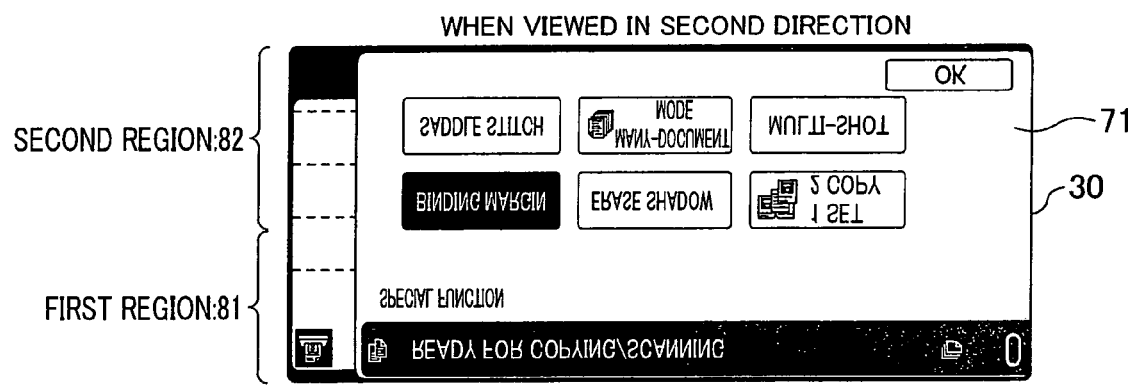
WHEN VIEWED IN SECOND DIRECTION
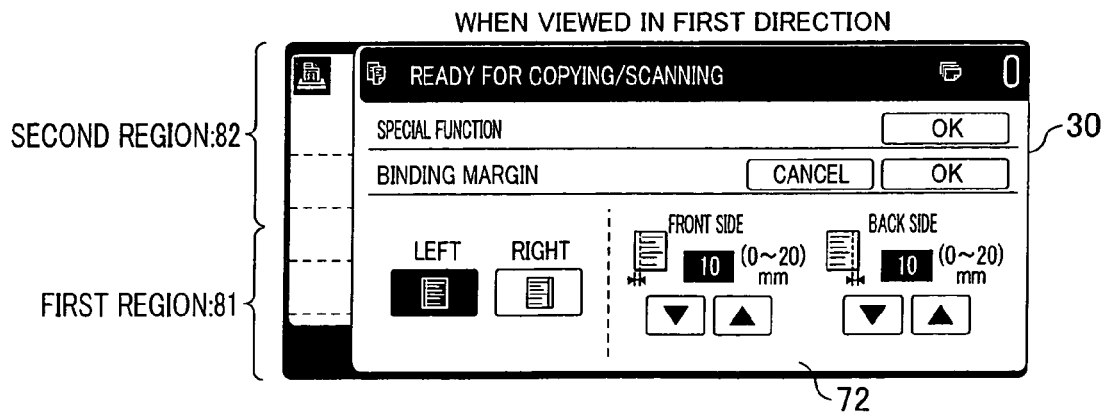
WHEN VIEWED IN FIRST DIRECTION

FIG. 12

MIRROR

| | FileName_8.txt | UserName_8 | 2004/01/09 |
| | FileName_7.txt | UserName_7 | 2004/01/08 |
| | FileName_6.txt | UserName_6 | 2004/01/07 |
| | FileName_5.txt | UserName_5 | 2004/01/06 |
| | FileName_4.txt | UserName_4 | 2004/01/05 |
| | FileName_3.txt | UserName_3 | 2004/01/04 |

WHEN VIEWED IN SECOND DIRECTION

| | FileName_3.txt | UserName_3 | 2004/01/04 |
| | FileName_4.txt | UserName_4 | 2004/01/05 |
| | FileName_5.txt | UserName_5 | 2004/01/06 |
| | FileName_6.txt | UserName_6 | 2004/01/07 |
| | FileName_7.txt | UserName_7 | 2004/01/08 |
| | FileName_8.txt | UserName_8 | 2004/01/09 |

WHEN VIEWED IN FIRST DIRECTION

| | FileName_2.txt | UserName_2 | 2004/01/03 |
| | FileName_1.txt | UserName_1 | 2004/01/02 |
| | FileName_0.txt | UserName_0 | 2004/01/01 |

FILE NAME | USER NAME | DATE

ALL JOBS | DISPLAY PER JOB

JOB STATUS | DATA SEARCH | BACK

1 / 1000

DISPLAY DEVICE, INPUT DEVICE, PRINTING DEVICE, AND ELECTRIC DEVICE

This Nonprovisional application claims priority under 35 U.S.C. §119(a) on Patent Application No. 2006/045844 filed in Japan on Feb. 22, 2006 and Patent Application No. 2006/045845 filed in Japan on Feb. 22, 2006, the entire contents of which are hereby incorporated by reference.

FIELD OF THE INVENTION

The present invention relates to (i) a display device having a display panel that is capable of either dual view displaying or multi-view displaying, and (ii) an input device allowing inputting of various commands via a touch screen that is capable of either dual view displaying or multi-view displaying.

BACKGROUND OF THE INVENTION

A dual view type liquid crystal display disclosed in each of Patent Citations 1 and 2 described below is known in the field of image display technology. Meanwhile, various types of operation panel having a touch screen via which an operation command is entered have been conventionally known. Developed in recent years is an operation panel whose touch screen is constituted by the dual view type liquid crystal display, as disclosed in each of Patent Citations 1 and 2.

[Patent Citation 1]

Japanese Unexamined Patent Publication Tokukai 2005-284592 (published on Oct. 13, 2005)

[Patent Citation 2]

Japanese Unexamined Patent Publication Tokukai 2005-078076 (published on Mar. 24, 2005)

FIG. 1(a) is a front view schematically illustrating a display screen of such a dual view type liquid crystal display. FIG. 1(b) is a perspective view of the display screen. FIG. 1(c) is a top view of the display screen. The wording "dual view type" refers to such a view type of simultaneously displaying (i) a first image in a first direction on the display screen 100 of the liquid crystal display and (ii) a second image, different from the first image, thereon in a second direction different from the first direction as shown in FIG. 1.

As shown in FIG. 1(c), in such a dual view type liquid crystal display, a viewing angle a of the first image displayed in the first direction is different from a viewing angle b of the second image displayed in the second direction. Therefore, it is impossible to view and recognize the second image in a viewing position 150 where a user can view and recognize the first image. On the other hand, it is impossible to view and recognize the first image in a viewing position 200 where the user can view and recognize the second image.

When the user's eyes (viewer's eyes who sees the liquid crystal display) are positioned in an intermediate point 300 between the viewing positions 150 and 200, an indistinct image in which the first and second images are mixed with each other is presented to the user, with the result that the user can recognizes neither the first image nor the second image from this indistinct image.

That is, the dual view type liquid crystal display suffers from such a problem that the user cannot simultaneously view the first and second image even when he/she needs to view them simultaneously.

SUMMARY OF THE INVENTION

An object of the present invention is to provide such a display device that allows a user to simultaneously view (i) a first image displayed in a first direction and (ii) a second image displayed in a second direction.

Another object of the present invention is to provide an input device that includes a touch screen for simultaneously displaying a first image in a first direction and a second image in a second direction, and that allows a user to simultaneously view the first image and the second image.

A display device of the present invention includes: a display section for simultaneously displaying (i) a first image in a first direction and (ii) a second image, which is different from the first image, in a second direction different from the first direction; and a reflecting section for reflecting the second image, which is displayed on the display section, toward a viewing position where the first image is viewable and recognizable.

Further, a printing device of the present invention includes the display device, and the display section is provided as a touch screen of an operation panel of the printing device.

With this, in the viewing position, it is possible to view and recognize simultaneously both (i) the first image displayed on the display section and (ii) the second image reflected by the reflecting section.

Further, an input device of the present invention includes: a touch screen for use in command inputting, and for simultaneously displaying (i) a first image in a first direction and (ii) a second image, which is different from the first image, in a second direction different from the first direction; and a reflecting section for reflecting the second image, which is displayed on the touch screen, toward a viewing position where the first image is viewable and recognizable. Further, an electric device of the present invention includes the input device.

With this, in the viewing position, it is possible to view and recognize simultaneously both (i) the first image displayed on the touch screen and (ii) the second image reflected by the reflecting section.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 9(a) is a diagram illustrating (i) a case of viewing, from a side of a first direction, the touch screen that displays an input waiting image in the first direction and that displays the special function setting use image in a second direction, and (ii) a case of viewing the touch screen from a side of the second direction. FIG. 9(b) is a diagram illustrating (i) a case of viewing, from the side of the first direction, the touch screen that displays the input waiting image in the first direction and that displays the special function setting use image in the second direction, and (ii) a mirror.

FIG. 10(a) is a diagram illustrating (i) a case of viewing, from the side of the first direction, the touch screen that displays the binding margin setting use image in the first direction and that displays the special function setting use image in the second direction, and (ii) a case of viewing the touch screen from the side of the second direction. FIG. 10(b) is a diagram illustrating (i) a case of viewing, from the side of the first direction, the touch screen that displays the binding margin setting use image in the first direction and that displays the special function setting use image in the second direction, and (ii) the mirror.

FIG. 11 is a diagram illustrating (i) a case of viewing the touch screen from the side of the first direction, (ii) a case of viewing the touch screen from the side of the second direction, and (iii) the mirror.

FIG. 12 is a diagram illustrating (i) a case of viewing, from the side of the first direction, the touch screen that displays a first job list image in the first direction and that displays a second job list image in the second direction, (ii) a case of viewing the touch screen from the side of the second direction, and (iii) the mirror.

DESCRIPTION OF THE EMBODIMENTS

One embodiment of the present invention will be described below with reference to FIG. 2 through FIG. 16. As one embodiment of a display device or an input device according to the present invention, the following assumes an operation panel, which is provided in an MFP (Multi Function Printer) having functions of a printer, a scanner, a copying machine, and a fax (facsimile).

Figure 1:
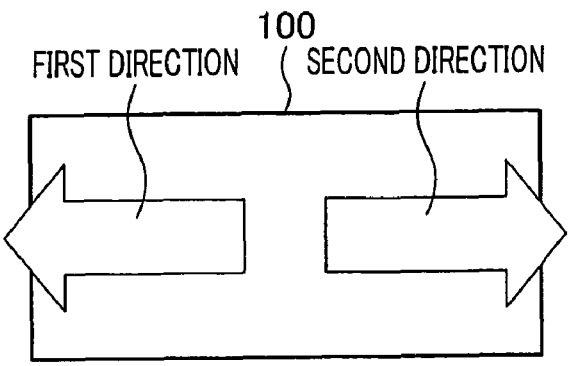
FIG. 1(a) is a front view schematically illustrating a liquid crystal display having a dual view function.
FIG. 1(b) is a perspective view schematically illustrating the liquid crystal display shown in FIG. 1(a).
FIG. 1(c) is a top view schematically illustrating the liquid crystal display shown in FIG. 1(a).
Figure 1:
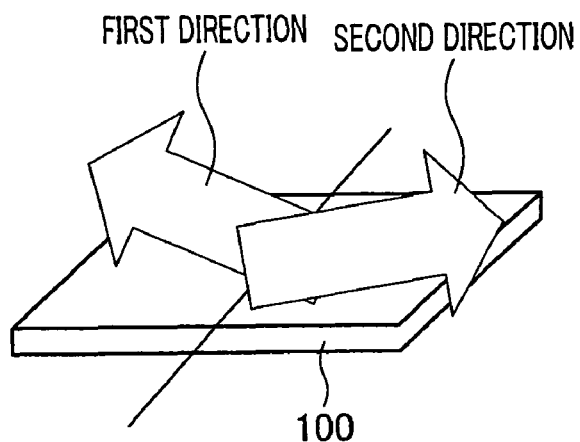
Figure 1:
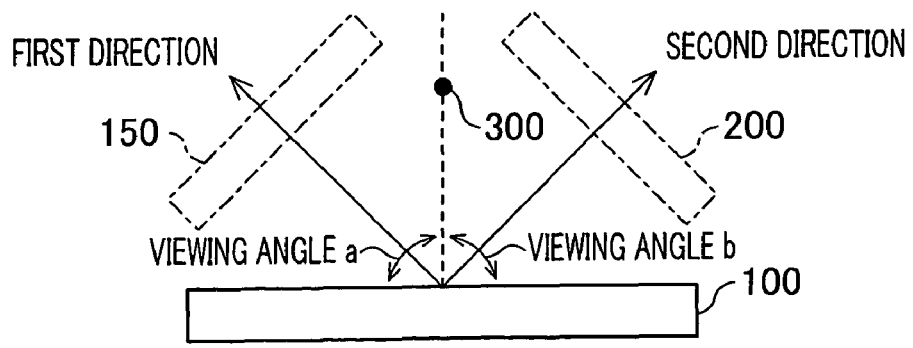
Figure 2:
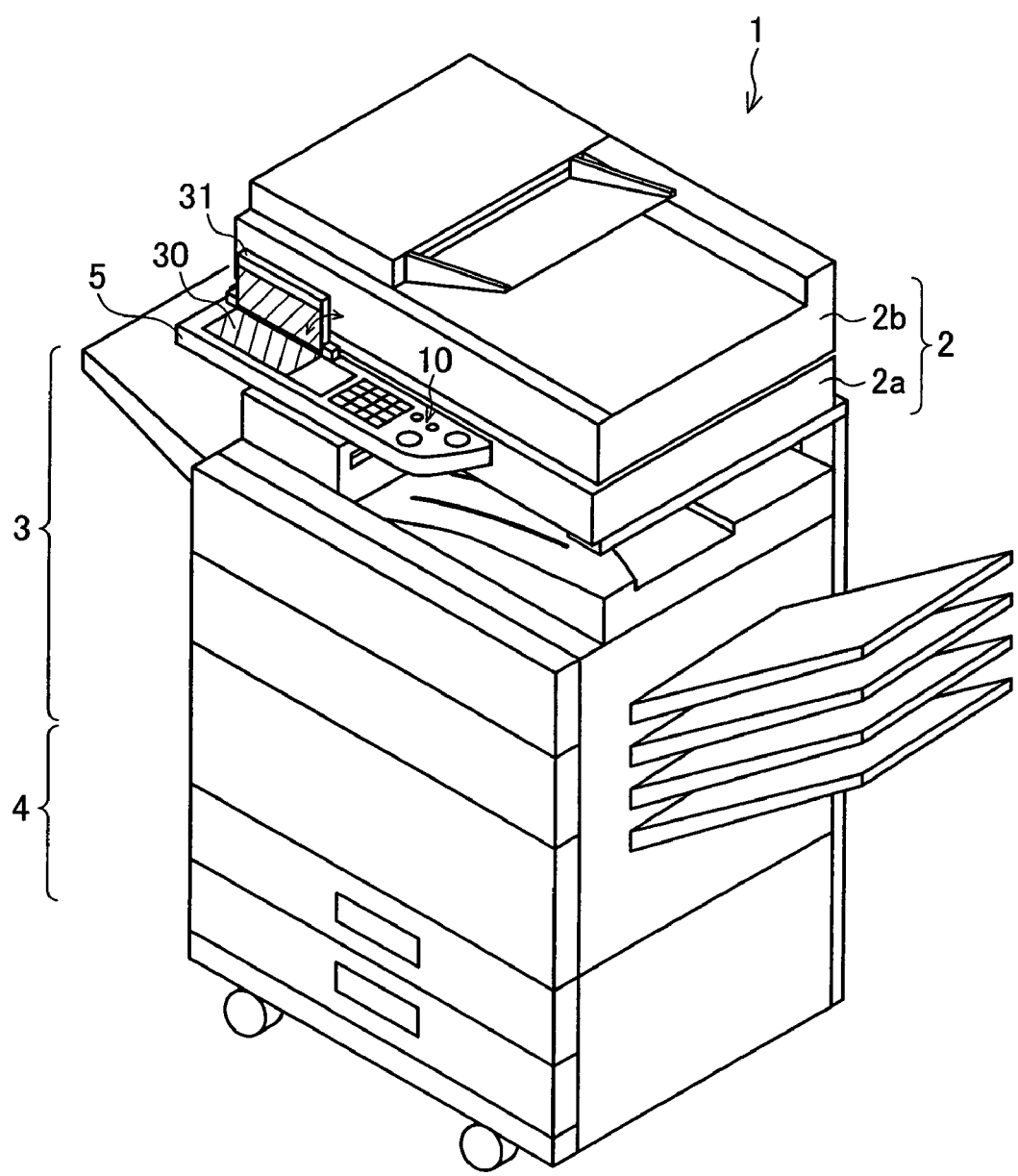
FIG. 2 is a perspective view illustrating an MFP provided with an operation panel of one embodiment of the present invention.

As shown in FIG. 2, an MFP (printing device) 1 includes (i) an image reading device (scanner) 2 for reading an image from a document (original) by using a CCD (Charge Coupled Device) or the like, and for outputting an image signal; (ii) an electrophotographic printer 3 for printing an image on a sheet in accordance with either the image signal sent from the image reading device 2 or an image signal sent from outside; and (iii) a sheet supply desk device 4 for sequentially supplying sheets to the printer 3.

In a lateral side with respect to a document table 2a of the image reading device 2, an operation panel 5 of the present embodiment is provided. The operation panel 5 has a function as display means for displaying various types of image to a user, and has a function as input means for entering various types of operation command in order to operate the MFP 1. The following fully explains the operation panel 5.

Firstly explained is an outer structure of the operation panel 5. As shown in FIG. 2, the operation panel 5 includes a hard key group 10, a touch screen 30, and openable/closable panel 31.

Figure 3:
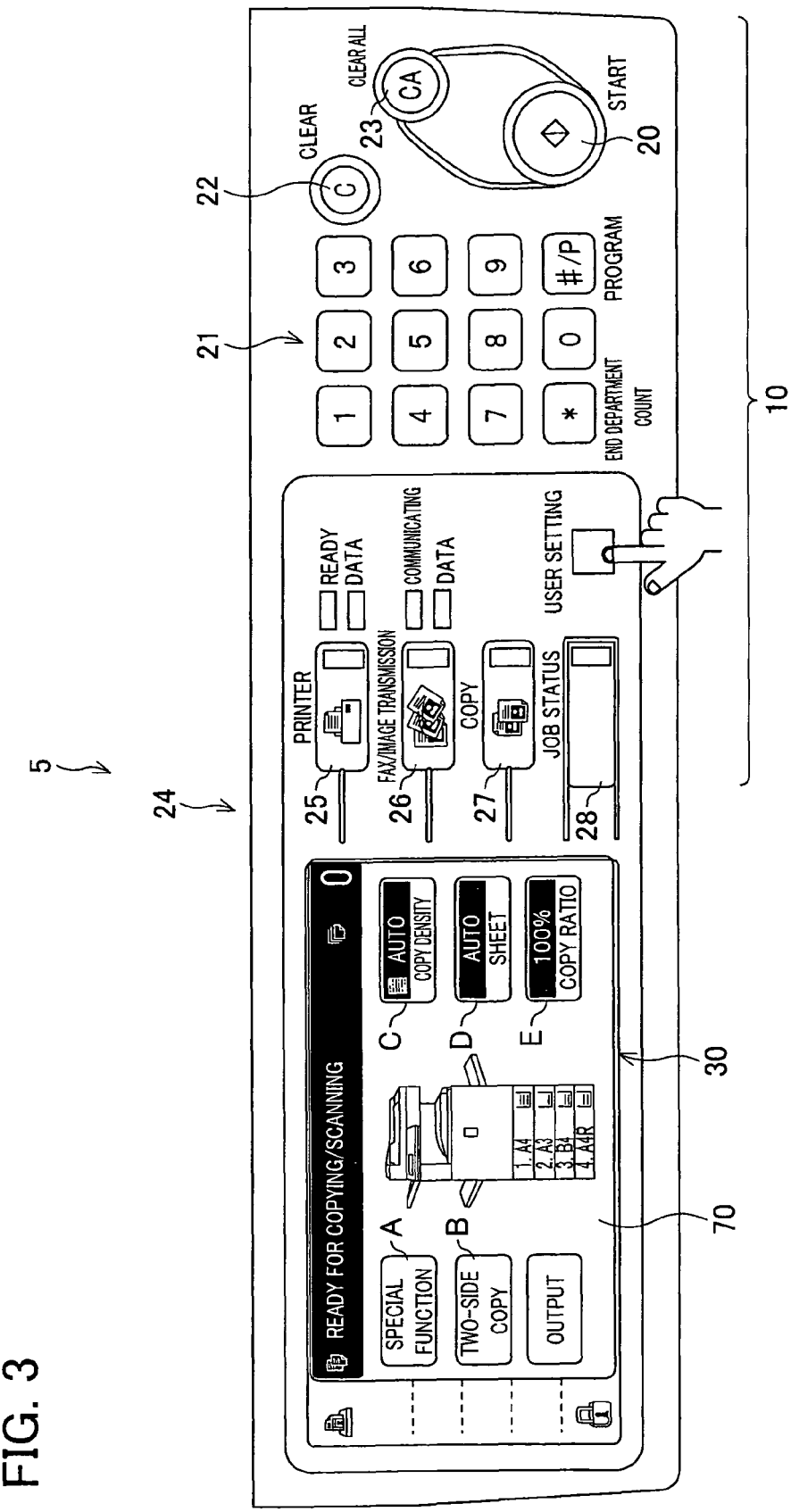
FIG. 3 is a front view illustrating the operation panel shown in FIG. 2.

As shown in FIG. 3, the hard key group 10 includes a start key 20, a numeric keypad 21, a clear key 22, a clear-all key 23, and an operation mode key group 24.

The start key 20 is a key for entering a command for executing a process according to an operation mode currently set in the MFP 1. The numeric keypad 21 is made up of keys for setting (entering) a number, such as the number of copies to be made. The number is displayed on the touch screen 30 as an image. The clear key 22 is a key for nullifying the number set by using the numeric keypad 21 and for canceling the most recent input value. The clear-all key 23 is a key for clearing various settings set by the user, and for aborting an operation of the MFP 1.

The operation mode group 24 is made up of a printer mode key 25, a transmitting mode key 26, a copy mode key 27, and a job status key 28.

The printer mode key 25 is a key for setting an operation mode of the MFP 1 in a printer mode. The printer mode refers to a mode in which the printer 3 is caused to carry out printing in accordance with an image signal sent from a terminal device (not shown).

The transmitting mode key 26 is a key for setting the operation mode of the MFP 1 in a transmitting mode. The transmitting mode refers to a mode in which the image reading device 2 is caused to read an image from a document and the image thus read from the document is sent to outside. Note that there are two types of transmitting mode: (i) a fax mode in which an image is transmitted to an external device via fax, and (ii) an image transmitting mode in which an image is transmitted to a terminal device connected to the MFP 1 via a network.

The copy mode key 27 is a key for setting the operation mode of the MFP 1 in a copy mode. The copy mode refers to a mode in which the image reading device 2 is caused to read an image from a document and the printer 3 is caused to print (duplicate) the image on a sheet.

The job status key 28 is a key for displaying a job list image on the touch screen 30. The job list image shows a list of unprocessed job files or processed job files in each of the above modes.

Explained next is a touch screen 30. The touch screen 30 displays various images for promoting entering of various commands into the MFP 1. The commands are entered by the user's touch on the touch screen 30.

Figure 5:
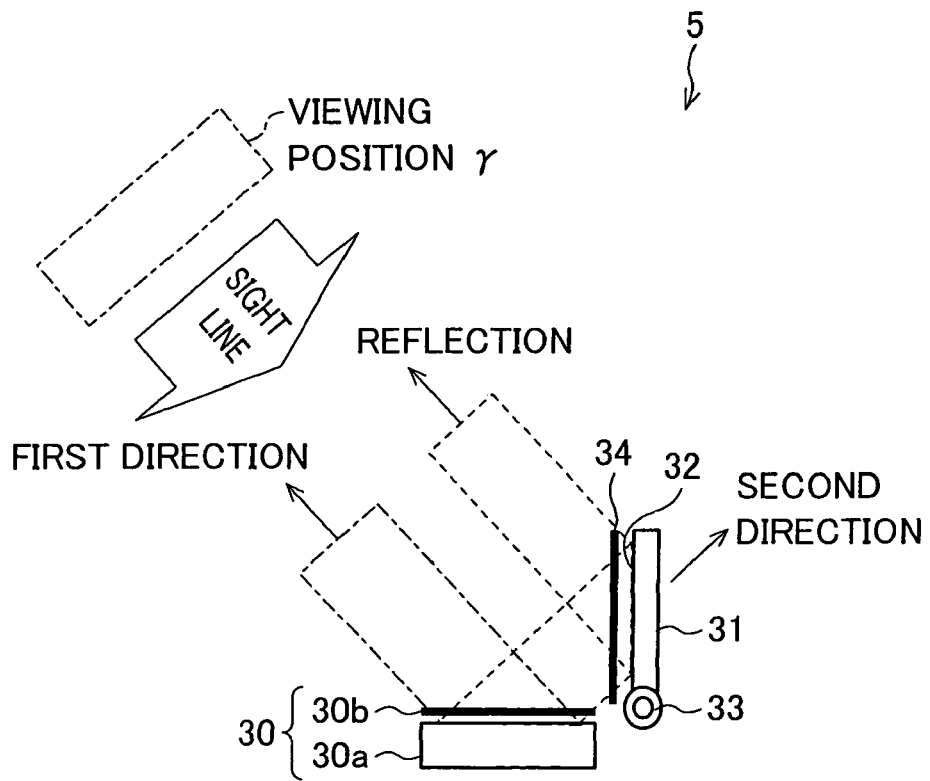
FIG. 5 is a side view schematically illustrating the touch screen and the cover member each shown in FIG. 4.

As shown in FIG. 5, the touch screen 30 is arranged such that a touch panel 30b is provided so as to cover a liquid crystal display panel 30a.

Figure 4:
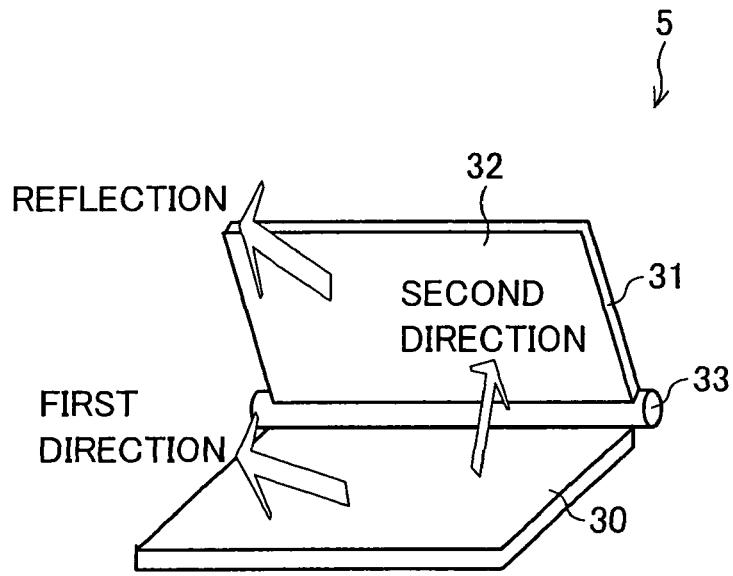
FIG. 4 is a perspective view illustrating a touch screen and a cover member, each of which is provided in the operation panel shown in FIG. 3.

The liquid crystal display panel 30a is a liquid crystal display having the dual view function. Therefore, the touch screen 30 has a function of simultaneously displaying a first image in a first direction and a second image in a second direction as shown in FIG. 4. The first and second images are different from each other, and the first and second directions are different from each other. That is, the touch screen 30 has a function of displaying two different images at the same time.

The touch panel 30b is an electrostatic capacitance coupling type touch panel made of a transparent material that changes a surface charge when touched by the user.

Explained next is an openable/closable panel 31. The openable/closable panel 31 is a cover member for the touch screen 30. As shown in FIG. 4, the openable/closable panel 31 has a side on which a hinge 33 is provided. The hinge 33 is installed around the touch screen 30 in the operation panel 5.

The openable/closable panel 31 is rotatable with respect to the hinge 33. The user rotates the openable/closable panel 31, thereby switching between (i) a close state in which the openable/closable panel 31 covers the touch screen 30 and (ii) an open state in which the touch screen 30 is exposed to outside. The open state is illustrated in FIG. 4 and FIG. 5.

As shown in FIG. 4 and FIG. 5, the openable/closable panel 31 has a surface, which faces the touch screen 30 and on which a mirror 32 is provided. Further, as shown in FIG. 5, the mirror 32 is covered with the touch panel 34. As is the case with the touch panel 30b, the touch panel 34 is an electrostatic capacitance coupling type touch panel made of a transparent material that changes a surface charge when touched by the user.

While the openable/closable panel 31 is in the open state as shown in FIG. 5, the mirror 32 receives the second image displayed on the touch screen 30, and reflects the second image toward a viewing position γ. The viewing position γ is a position at which the first image displayed on the touch screen 30 and the mirror surface of the mirror 32 are viewable and recognizable.

Therefore, when viewing from the viewing position γ, the user can view and recognize simultaneously both (i) the first image displayed on the touch screen 30 and (ii) the second image reflected by the mirror (i.e., the second image reflected in the mirror).

Figure 6:
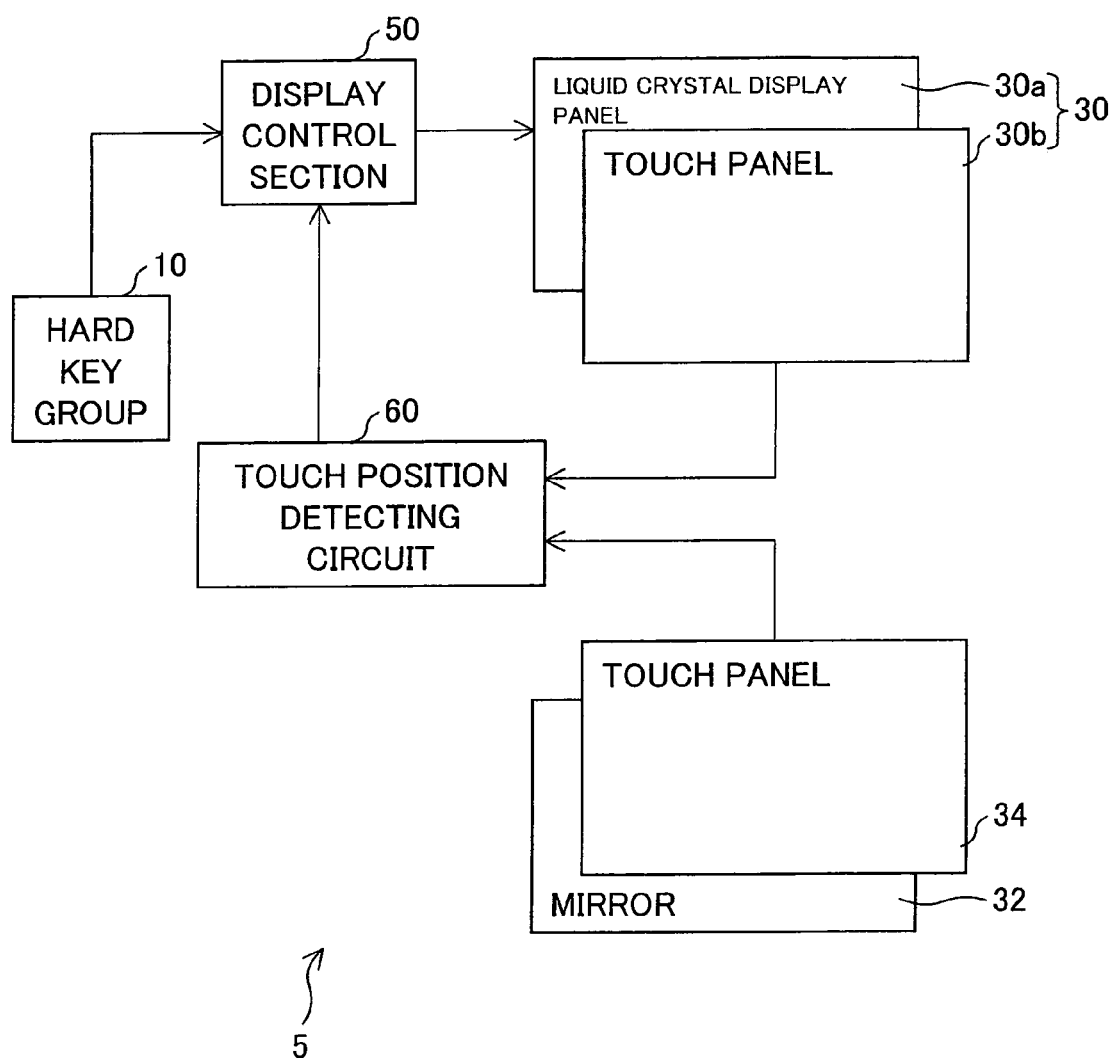
FIG. 6 is a block diagram illustrating an internal structure of the operation panel according to the embodiment of the present invention.

The following fully explains an internal structure of the operation panel 5. FIG. 6 is a block diagram illustrating the internal structure of the operation panel 5.

As shown in FIG. 6, the operation panel 5 includes a touch position detecting circuit 60 and a display control section 50, in addition to (i) the hard key group 10, (ii) the touch screen 30 made up of (i) the liquid crystal display panel 30a and the touch panel 30b, (iii) the mirror 32, and (iv) the touch panel 34 covering the mirror 32.

The touch position detecting circuit 60 is a circuit for detecting a change of the surface charge of the touch panel 30b so as to find a coordinate value indicating a user's touch position on the touch panel 30b (i.e., user's touch position on the touch screen 30), and for sending the found coordinate value to the display control section 50. Likewise, the touch position detecting circuit 60 detects a change of the surface charge in the touch panel 34 so as to find a coordinate value indicating a user's touch position on the touch panel 34 (i.e., user's touch position on the mirror 32). Then, the touch position detecting circuit 60 sends the found coordinate value to the display control section 50.

The display control section 50 is a computer for controlling a display operation of the liquid crystal display panel 30a, i.e., for controlling a display operation of the touch screen 30. The display control section 50 is constituted by a CPU (Central Processing Unit), a RAM (Random Access Memory), a ROM (Read Only Memory), and the like. Specifically speaking, the display control section 50 detects the touch position in accordance with the coordinate value sent from the touch position detecting circuit 60, and carries out control of changing, according to the detected touch position, a content of the first or second image displayed on the touch screen 30. The following fully explains the control carried out by the display control section 50.

Firstly, while the MFP 1 is in a waiting mode in which the MFP 1 waits for entering of an instruction from the user, the display control section 50 carries out control of displaying, on the touch screen 30 as the first image, an input waiting image used in an operation mode currently set in the MFP 1. For example, in cases where the copy mode is set in the MFP 1, an input waiting image 70, which is used in the copy mode, is displayed as the first image on the touch screen 30 as shown in FIG. 3.

When the user views and recognizes the input waiting image 70, which is displayed as the first image, from the viewing position γ shown in FIG. 5 and touches the touch screen 30, the display control section 50 determines, in accordance with the position touched by the user, a content of the second image to be displayed in the second direction. Then, an image having the content thus determined is displayed as the second image.

For example, see FIG. 3. The input waiting image 70 displayed as the first image is a menu image including items to be selected by the user, such as a special function button A, a two-side copy button B, a copy density button C, a sheet button D, and a copy ratio button E. Now, consider a case where the user touches the touch screen 30 so as to cover a position indicating the special function button A. In this case, in accordance with the coordinate value sent from the touch position detecting circuit 60, the display control section 50 detects as the touch position the position indicating the special function button A. Then, the display control section 50 controls the operation of the touch screen 30 such that: while maintaining the display of the input waiting image 70 as the first image, a special function setting use image 71 (see FIG. 7(a)) is displayed as the second image. The special function setting use image 71 is a lower hierarchy image with respect to the input waiting image 70, and is an image corresponding to the special function button A.

Here, with regard to the second image, the display control section 50 carries out such control that a mirror image of the image supposed to be originally presented is displayed on the touch screen 30. Therefore, as shown in FIG. 9(a), the input waiting image 70 serving as the first image is displayed on the touch screen 30 when viewing the touch screen 30 from a side of the first direction, whereas the mirror image of the special function setting use image 71 serving as the second image is displayed thereon when viewing the touch screen 30 from a side of the second direction. Note that each of FIG. 9(*a*) and later described figures, FIG. 10(*a*), FIG. 11, and FIG. 12, illustrates two touch screens 30; however, this is only for convenience of explanation. In reality, only one touch screen 30 is provided. Specifically, the touch screen 30 in the upper portion of each of FIG. 9(*a*), FIG. 10(*a*), FIG. 11 and FIG. 12 illustrates a state of the screen when viewed from the side of the second direction (see FIG. 5). On the other hand, the touch panel 30 in the lower portion thereof illustrates a state of the screen when viewed from the side of the first direction.

The mirror image (see FIG. 9(*a*)) of the special function setting use image 71 thus displayed on the touch screen 30 incidents on the mirror 32, with the result that the mirror image is reflected by the mirror 32 toward the viewing position γ. The image thus reflected in the mirror 32 coincides with an image obtained by turning the mirror image other way round. Therefore, the special function setting use image 71 is reflected in the mirror 32 in such a manner that the special function setting use image 71 is supposed to be originally presented to the user.

In this way, as shown in FIG. 9(*b*), when viewing from the viewing position γ shown in FIG. 5, the user can view and recognize simultaneously both (i) the input waiting image (first image) 70 displayed on the touch screen 30 and (ii) the special function setting use image (second image) 71 reflected in the mirror 32 in such a manner that the special function setting use image 71 is supposed to be originally presented to the user. In addition, FIG. 9(*b*) illustrates the touch screen 30 and the mirror 32 each viewed from the viewing position γ shown in FIG. 5.

Further, as shown in FIG. 9(*b*), the special function setting use image 71 reflected in the mirror 32 and serving as the second image is a menu image including items to be selected by the user, such as a binding margin button F, a saddle stitch button G, and a multi-shot button H. Consider a case where, e.g., the user touches the touch panel 34 provided on the mirror 32, so as to cover with a finger a position indicating the binding margin button F. In this case, in accordance with the coordinate value sent from the touch position detecting circuit 60, the display control section 50 detects as the touch position the position indicating the binding margin button F. Then, the display control section 50 controls the operation of the touch screen 30 such that a binding margin setting use image 72 (see FIG. 7(*b*)) is displayed as the first image while maintaining the display of the mirror image of the special function setting image 71 as the second image. The binding margin setting use image 72 is a lower hierarchy image with respect to the special function setting use image 71, and is an image corresponding to the binding margin button F.

Accordingly, as shown in FIG. 10(*a*), the binding margin setting image 72 serving as the first image is displayed on the touch screen 30 when viewing the touch screen 30 from the side of the first direction, whereas the mirror image of the special function setting image 71 serving as the second image is displayed thereon when viewing the touch screen 30 from the side of the second direction.

Therefore, as shown in FIG. 10(*b*), when viewing from the viewing position γ shown in FIG. 5, the user can view and recognize simultaneously both (i) the binding margin setting use image 72 displayed on the touch screen 30 and serving as the first image and (ii) the special function setting use image 71 reflected in the mirror 32 and serving as the second image. In addition, FIG. 10(*b*) illustrates the touch screen 30 and the mirror 32 each viewed from the viewing position γ shown in FIG. 5.

As described above, the operation panel 5 of the present embodiment is arranged such that: not only the touch panel 30*b* is so provided as to cover the liquid crystal panel 30*a* in the touch screen 30, but also the touch panel 34 is so provided as to cover the mirror 32. Moreover, when viewing from the viewing position γ, the user can view and recognize simultaneously both (i) the first image displayed on the touch screen 30 and (ii) the second image reflected in the mirror 32. When the user touches the touch screen 30 so as to cover with a finger any one of the buttons (selection items) presented in the first image, an image, which is a lower hierarchy image with respect to the first image and corresponds to the button, is reflected in the mirror 32 as the second image while the first image is kept on being displayed on the touch screen 30. Further, when the user touches the mirror 32 (i.e., the touch panel 34) so as to cover with a finger any one of the buttons presented in the second image reflected in the mirror 32, an image, which is a lower hierarchy image with respect to the second image and corresponds to the button, is displayed on the touch screen 30 as the first image while the second image is kept on being reflected in the mirror 32. As such, the structure above allows the user to view and recognize simultaneously both (i) an upper hierarchy menu image and (ii) a lower hierarchy menu image corresponding to an item that is contained in the upper hierarchy menu image and that has been selected by the user.

Figure 7:
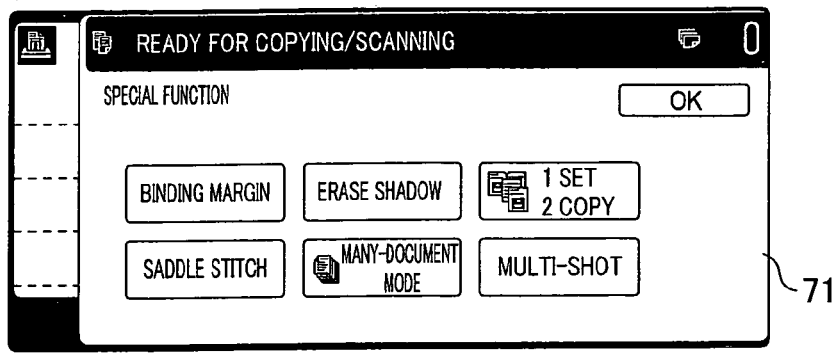
FIG. 7(a) is a diagram illustrating a special function setting use image, which is an image to be displayed on the operation panel shown in FIG. 3.
FIG. 7(b) is a diagram illustrating a binding margin setting use image, which is an image to be displayed on the operation panel shown in FIG. 3.
FIG. 7(c) is a diagram illustrating a saddle stitch setting use image, which is an image to be displayed on the operation panel shown in FIG. 3.
FIG. 7(d) is a diagram illustrating a multi-shot setting use image, which is an image to be displayed on the operation panel shown in FIG. 3.
Figure 7:
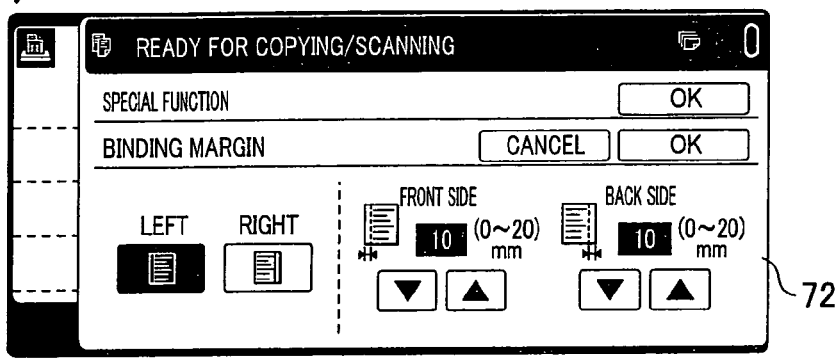
Figure 7:
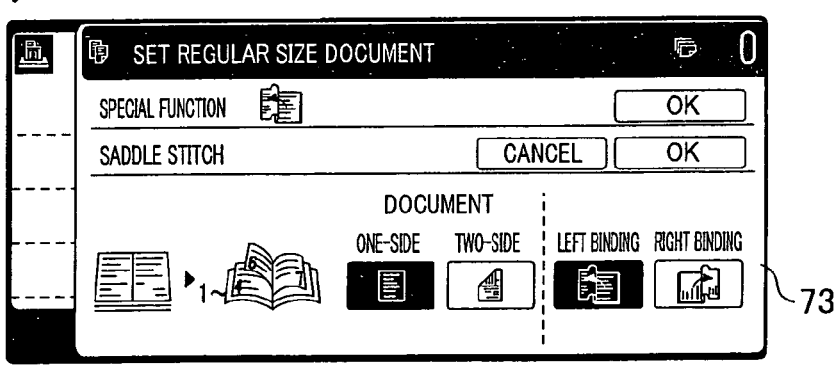
Figure 7:
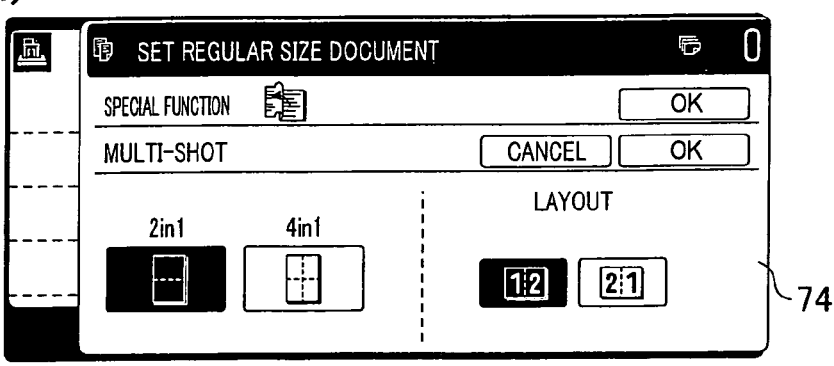
Figure 8:
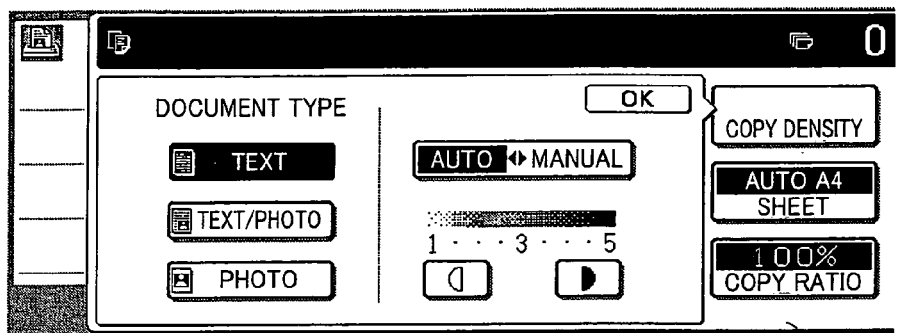
FIG. 8(a) is a diagram illustrating a copy density setting use image, which is an image to be displayed on the operation panel shown in FIG. 3.
FIG. 8(b) is a diagram illustrating a copy ratio setting use image, which is an image to be displayed on the operation panel shown in FIG. 3.
FIG. 8(c) is a diagram illustrating a sheet setting use image, which is an image to be displayed on the operation panel shown in FIG. 3.
FIG. 8(d) is a diagram illustrating a two-side copy setting use image, which is an image to be displayed on the operation panel shown in FIG. 3.
Figure 8:
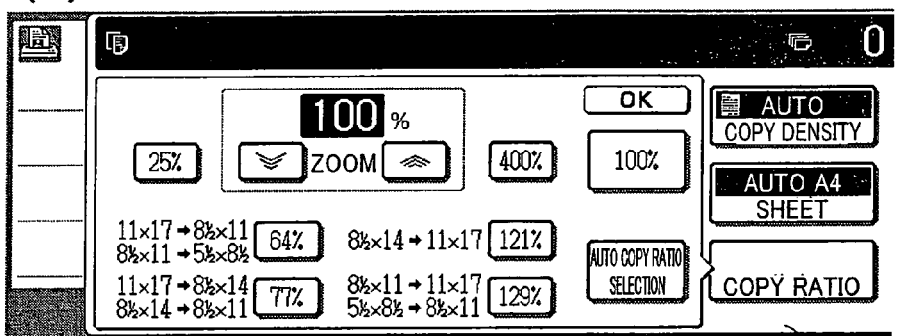
Figure 8:
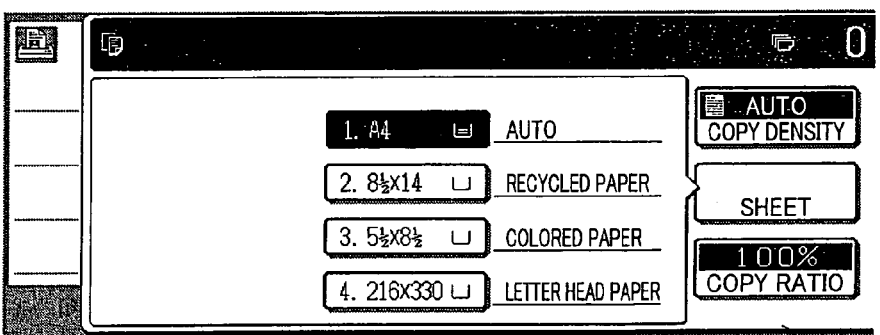
Figure 8:
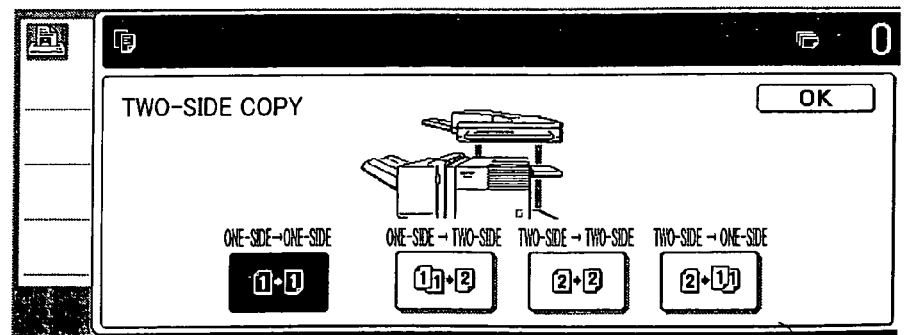

The above description explains the case where: when the user touches the position that indicates the special function button A presented in the input waiting image 70 displayed as the first image and shown in FIG. 3, the mirror image of the special function setting use image 71 (see FIG. 7(*a*)) corresponding to the special function button A is displayed as the second image on the touch screen 30. Now, consider the other examples. When the user touches a position that indicates the two-side copy button B presented in the input waiting image 70, a mirror image of a two-side copy setting use image 78 shown in FIG. 8(*d*) is displayed as the second image. Meanwhile, when the user touches a position that indicates the copy density button C presented in the input waiting image 70 displayed as the first image and shown in FIG. 3, a mirror image of a copy density setting use image 75 shown in FIG. 8(*a*) is displayed as the second image. Meanwhile, when the user touches a position that indicates the sheet button D presented in the input waiting image 70, a mirror image of a sheet setting use image 77 shown in FIG. 8(*c*) is displayed as the second image. Meanwhile, when the user touches a position that indicates the copy ratio button E presented in the input waiting image 70, a mirror image of a copy ratio setting use image 76 shown in FIG. 8(*b*) is displayed as the second image.

Further, the above description explains the case where: when the user touches the position that indicates the binding margin button F presented in the special function setting use image 71 serving as the second image and reflected in the mirror 32, the binding setting use image 72 (see FIG. 7(*b*)) corresponding to the binding margin button F is displayed on the touch screen 30 as the first image. Now, consider the other examples. When the user touches a position that indicates the saddle stitch button G shown in FIG. 9(*b*), a saddle stitch setting use image 73 (see FIG. 7(*c*)) corresponding to the saddle stitch button G is displayed on the touch screen 30 as the first image. Meanwhile, when the user touches a position that indicates the multi-shot button H shown in FIG. 9(*b*), a multi-shot setting use image 74 (see FIG. 7(*d*)) corresponding to the multi-shot button H is displayed on the touch screen 30 as the first image.

Further, in the present embodiment, the job list image can be displayed on the touch screen 30 by pressing the job status key 28 shown in FIG. 3. Hereinafter, this will be explained. When the display control section 50 shown in FIG. 6 detects press-down of the job status key 28 of the hard key group 10, the display control section 50 carries out control such that: a first job list image (first image) 85 is displayed on the touch screen 30 in the first direction and a mirror image of a second job list image (second image) 86 is displayed thereon in the second direction (see FIG. 12).

With this, as shown in FIG. 12, the first job list image 85 is displayed on the touch screen 30 when viewing the touch screen 30 from the side of the first direction, whereas the mirror image of the second job list image 86 is displayed on the touch screen 30 when viewing the touch screen 30 from the side of the second direction. Further, as shown in FIG. 12, when the user views the touch screen 30 from the viewing position γ, the user can view and recognize simultaneously both (i) the first job list image 85 displayed on the touch screen 30, and (ii) the second job list image 86 reflected in the mirror 32.

Here, see FIG. 12. In the first job list image 85, three job filenames are presented. In the second job list image 86, six other job filenames, which cannot be presented in the first job list image 85 due to the size of the first job list image 85, are supplementarily presented. Thus, the user can simultaneously check nine job filenames. In other words, the second image (second job list image 86) presents information supplementary to the information presented by the first image (first job list image 85).

If the first job list image 85 and the second job list image 86 are displayed on a normal display panel having no dual view function, the sizes of the images needs to be reduced such that the images are displayed thereon. This makes it difficult to view and recognize the job filenames. Meanwhile, if the first job list image 85 and the second job list image 86 are sequentially displayed, the user can check only six job filenames at maximum simultaneously. That is, in this case, the user cannot check simultaneously nine job filenames unlike the present embodiment.

The structure described above, i.e., the operation panel 5 including the touch screen 30 and the mirror 32 corresponds to one embodiment of the display device or the input device of the present invention. The touch screen 30 has a function as a display section for (i) displaying the first image in the first direction and (ii) displaying the second image in the second direction. The second image is different from the first image, and the second direction is different from the first direction. The mirror 32 has a function as a reflecting section for reflecting, toward the viewing position γ in which the first image is viewable and recognizable, the second image displayed on the touch screen 30. With this, in the viewing position γ, the user can view and recognize simultaneously both (i) the first image displayed on the touch screen 30 and (ii) the second image reflected by the mirror 32.

Note that the reflecting section for reflecting, toward the viewing position γ, the second image displayed on the touch screen 30 is not limited to the mirror 32. Instead of the mirror 32, a translucent glass having a reflecting function, a translucent resin, a shiny resin, a shiny metal plate, or the like may be used as the reflecting section. Even such a reflecting section is capable of fairly reflecting the second image.

Further, in the present embodiment, the liquid crystal display panel 30a of the dual view type is used in the touch screen 30. However, the liquid crystal display panel 30a is not limited to such a dual view type one as long as the liquid crystal display panel 30a has a function of simultaneously displaying (i) the first image in the first direction and (ii) the second image in the second direction. The present invention can be realized by using a multi-view type liquid crystal display. Such dual view or multi view can be realized in a display device other than the liquid display panel as described in Patent citation 1, Paragraph [0076] and Patent citation 2, Paragraph [0137]. Therefore, the present invention can be realized by using an organic EL (electro luminescence) panel, a CRT (cathode ray tube), or the like, instead of the liquid crystal panel 30a.

Further, the present invention is not limited to such a structure that the reflecting section is constituted by one mirror 32. The reflecting section may be constituted by a plurality of mirrors. For example, the reflecting section may be constituted by (i) a mirror f for reflecting the second image displayed on the touch screen 30, in a direction different from the first and second directions, and (ii) a mirror g for reflecting the second image reflected by the mirror f, toward the viewing position γ.

Further, as shown in FIG. 9(a) or FIG. 10(a), the second image displayed on the touch screen 30 is a mirror image of an image that is supposed to be presented to the user. Therefore, the second image reflected in the mirror 32 coincides with the image that is supposed to be presented to the user. On this account, when viewing from the viewing position γ, the user does not view and recognize the mirror image but can view and recognize the image that is supposed to be originally presented.

Further, in the present embodiment, the openable/closable panel 31 on which the mirror 32 is formed is rotatable as shown in FIG. 4. By rotating the openable/closable panel 31, it is possible to adjust an angle between the screen of the touch screen 30 and the mirror surface of the mirror 32. This makes it possible to adjust a reflection angle of the mirror 32 to be an angle suitable to a viewpoint (positions of eyes) of the viewer positioned in the viewing position γ.

In the present embodiment, it is preferable that the mirror surface of the mirror 32 be as large as the screen of the touch screen 30, or be larger than the screen of the touch screen 30. With this, the second image displayed on the touch screen 30 can be entirely reflected by the mirror 32. This restrains such inconvenience that only a part of the second image displayed on the touch screen 30 is reflected by the mirror 32.

Further, in the present embodiment, each of the first and second images is a menu image presenting a plurality of buttons (selection items) to be selected by the user. On this account, the user can view and recognize simultaneously these two images each indicating the menu presenting the selection items.

In the present embodiment, the mirror 32 is covered with the touch panel 34. The first image displayed on the touch screen 30 presents the buttons (selection items) to be selected by the user's touching operation with respect to the touch screen 30, and the second image reflected in the mirror 32 presents the buttons (selection items) to be selected by the user's touching operation with respect to the touch panel 34. Further, when the user touches the touch screen 30 so as to select a button presented in the first image displayed on the touch screen 30, the first image is kept to be displayed on the touch screen 30 but a lower hierarchy image corresponding to the selected button is reflected in the mirror 32 as the second image. When the user touches the touch panel 34 covering the mirror 32, so as to select a button presented in the second image reflected in the mirror 32, the second image is kept to be reflected in the mirror 32 but a lower hierarchy image corresponding to the selected button is displayed on the touch screen 30 as the first image.

Further, the operation panel 5 of the present embodiment is arranged such that the mirror 32 reflecting the second image is covered with the touch panel 34 and each of the buttons presented in the second image is selectable by the touching operation with respect to the touch panel 34. However, even when the operation panel 5 is not arranged such that the mirror 32 is covered with the touch panel 34, each of the buttons presented in the second image can be selected by the touching operation. Specifically, the operation panel 5 is arranged such that only the touch screen 30 accepts a touching operation with respect to each of the buttons presented in the first and second images. For example, see FIG. 11. A first region 81 and a second region 82 are set in the touch screen 30 such that: the first region 81 only accepts a touching operation with respect to each of the buttons (selection items) presented in the first image, and the second region 82 only receives a touching operation with respect to each of the buttons (selection items) presented in the second image.

By the touching operation with respect to the first region of the touch screen 30, the user can select each of the buttons presented in the binding margin setting use image 72 serving as the first image. On the other hand, by the touching operation with respect to the second region of the touch screen 30, the buttons presented in the mirror image of the special function setting image 71 serving as the second image can be selected. As such, by the touching operation with respect to the touch screen 30, not only the buttons presented in the first image but also the buttons presented in the second image can be selected.

However, in the viewing position γ shown in FIG. 5, the user cannot view and recognize the mirror image of the special function setting use image 71 that is displayed on the touch screen 30 and that serves as the second image. Therefore, as shown in FIG. 11, for the touching operation with respect to the second region 82 of the touch screen 30, the user guesses where in the touch screen 30 the positions of the buttons presented in the mirror image of the special function setting use image (second image) 71 are presented, which mirror image is displayed on the touch screen 30. The user makes such a guess with reference to the special function setting use image 71 that is reflected in the mirror 32 and that serves as the second image.

Further, as shown in FIG. 11, when viewing the touch screen 30 from the side of the first direction, the binding margin setting use image 72 serving as the first image is displayed thereon. It is preferable that the buttons presented in the binding margin setting use image 72 be positioned within an area overlapping with the first region 81. Meanwhile, when viewing the touch screen 30 from the side of the second direction, the mirror image of the special function setting use image 71 serving as the second image is displayed thereon. It is preferable that the buttons presented in the special function setting use image 71 be positioned within an area overlapping with the second region 82.

This makes it possible to avoid such inconvenience that a position to be touched to select a button presented in the binding margin setting use image 72 serving as the first image coincides with a position to be touched to select a button presented in the special function setting use image 71 serving as the second image.

Further, the operation panel 5 of the present embodiment is applicable to an electric device other than the MFP 1. For example, the operation panel 5 is applicable to an electric device such as a FAX, a car navigation system, an ATM (automated teller machine), and various types of vending machine.

Further, in the present embodiment, the touch screen 30 is used as the display section for simultaneously displaying (i) the first image in the first direction and (ii) the second image, which is different from the first image, in the second direction different from the first direction. However, the display section is not limited to the touch screen 30, and may be the liquid crystal display panel 30a that is not covered with the touch panel 30b. Therefore, the display device of the present invention is applicable to not only an operation panel provided with a touch screen, but also a device having a display screen such as a home-use television and a personal computer.

Figure 13:
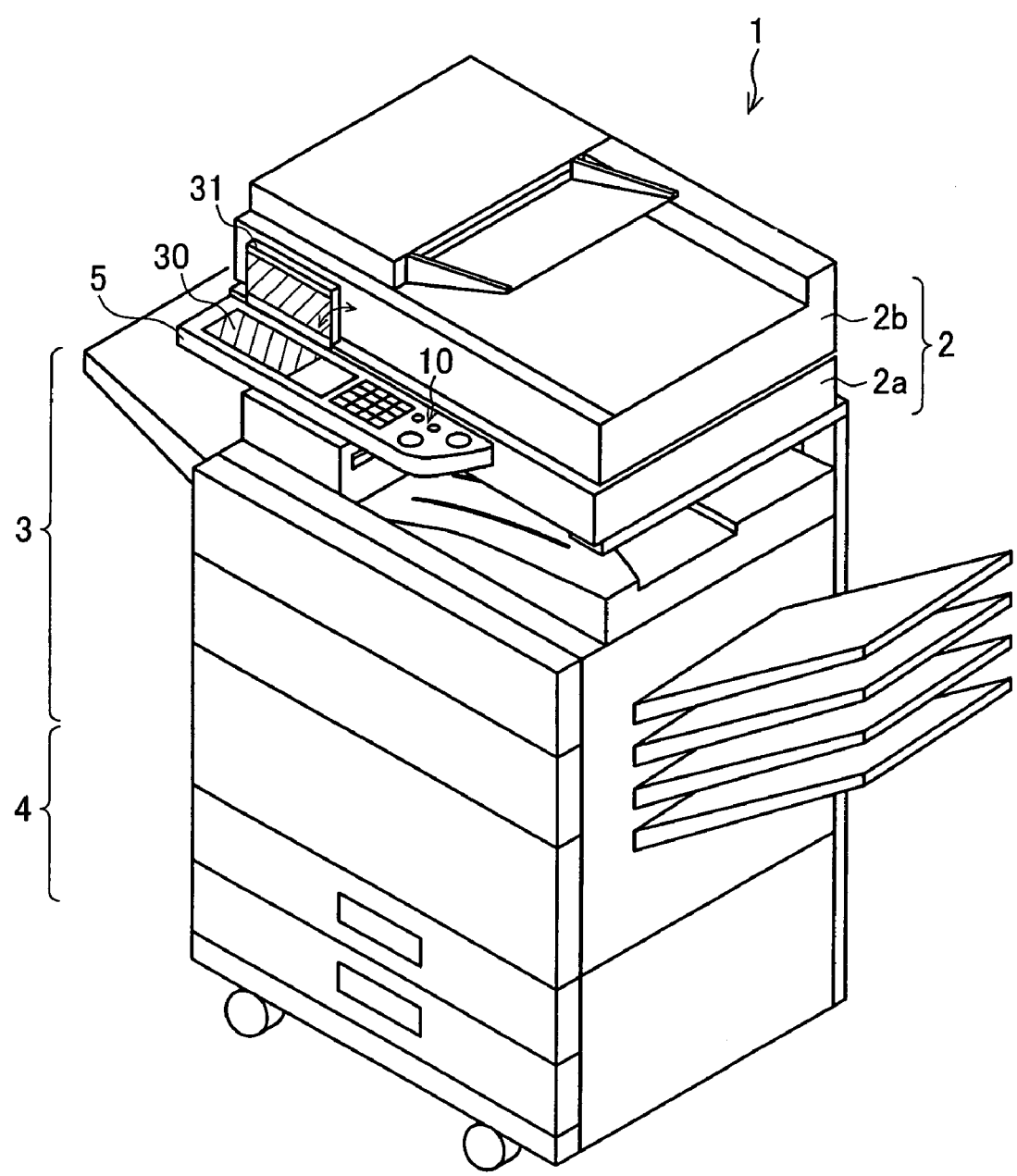
FIG. 13 is a perspective view illustrating an MFP, which includes an operation panel of one embodiment of the present invention and in which a cover member is provided in a document table.
Figure 14:
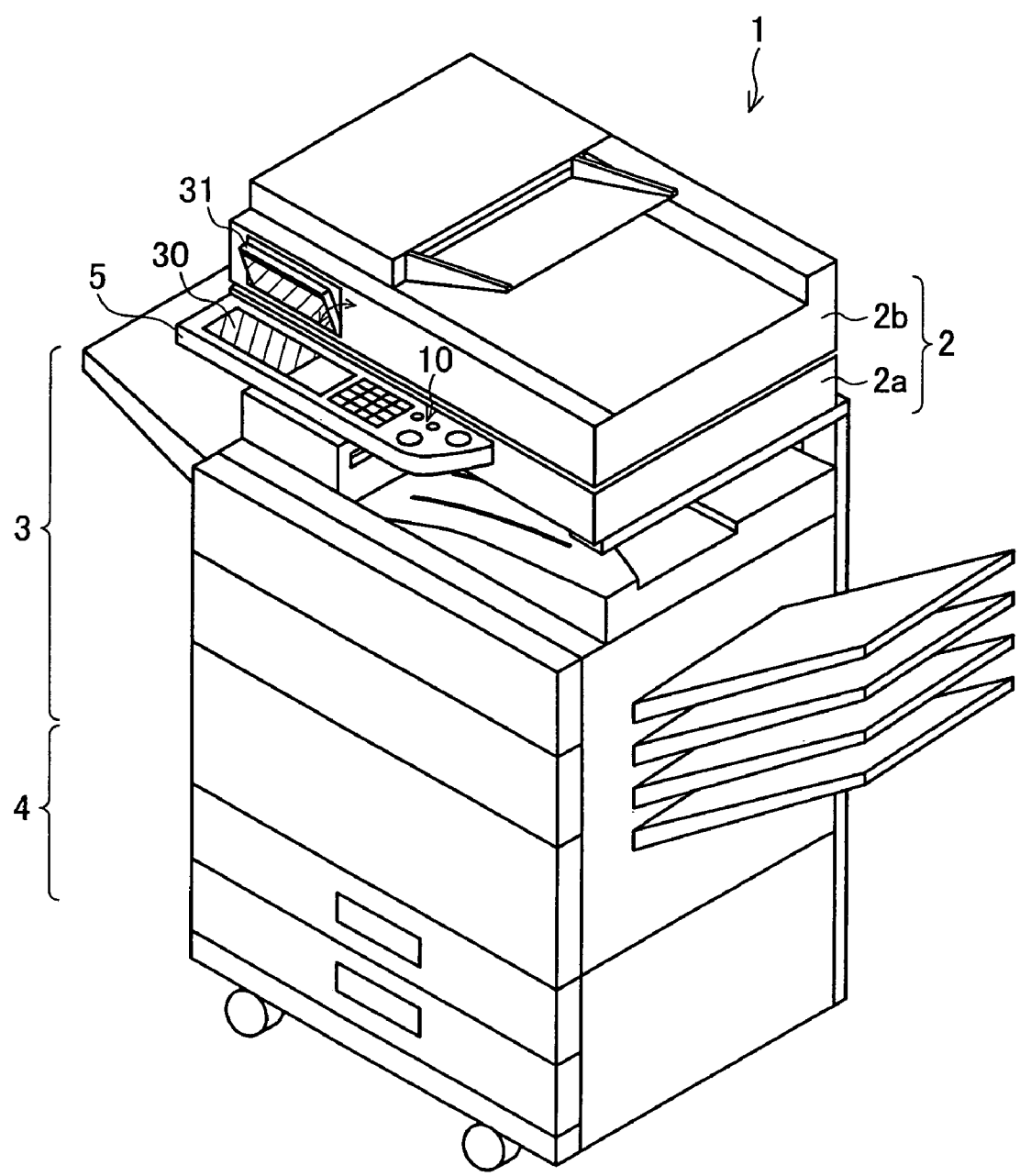
FIG. 14 is a perspective view illustrating an MFP, which includes an operation panel of one embodiment of the present invention and in which a cover member is provided in a document feeding section.

In the present embodiment, the openable/closable panel 31 on which the mirror 32 is formed is rotatably installed in the operation panel 5 as shown in FIG. 2; however, the openable/closable panel 31 is not limited to such a structure. For example, the openable/closable panel 31 may be rotatably installed in an end portion of the document table 2a as shown in FIG. 13. Alternatively, the openable/closable panel 31 may be rotatably installed in a lateral portion of a document feeding section 2b of the image reading device 2 as shown in FIG. 14. In the case of the structure shown in FIG. 13 or FIG. 14, a combination of the operation panel 5 and the mirror 32 is one embodiment of the display device or the input device of the present invention.

Figure 15:
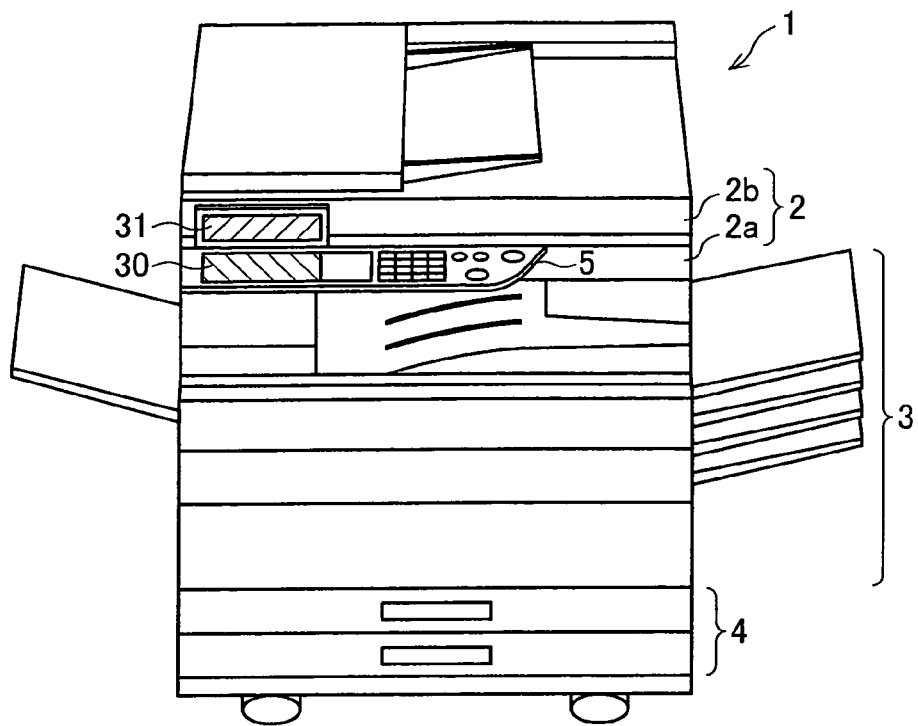
FIG. 15 is a perspective view illustrating an MFP, which includes an operation panel of one embodiment of the present invention and in which a cover member is fixed in the document table.
Figure 16:
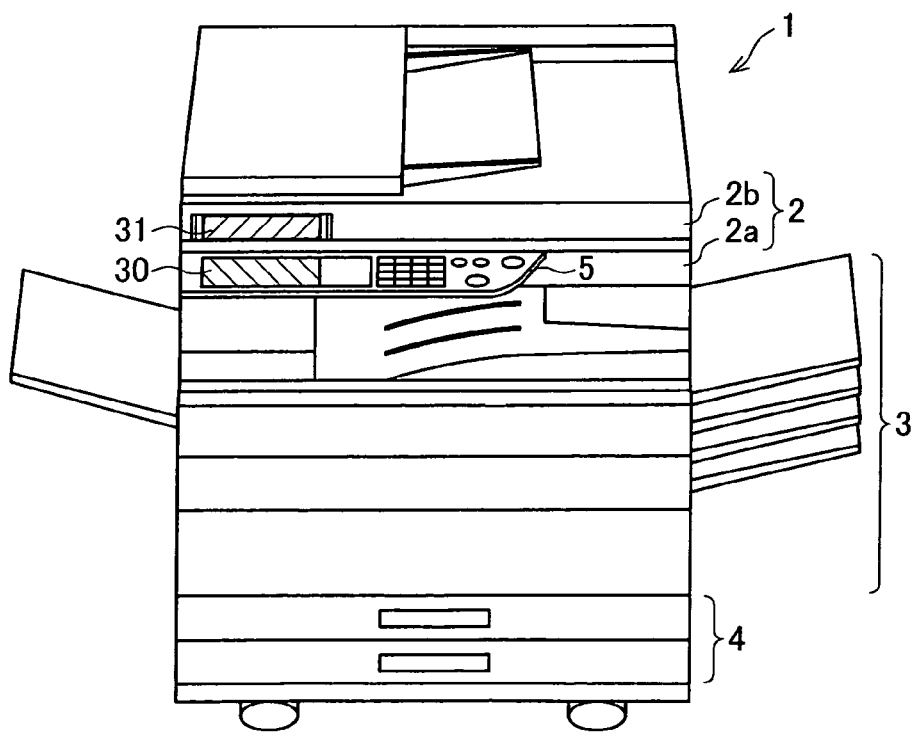
FIG. 16 is a perspective view illustrating an MFP, which includes an operation panel of one embodiment of the present invention and in which a cover member is fixed in the document feeding section.

Further, in the present embodiment, as shown in FIG. 2 and FIG. 4, the openable/closable panel 31 is rotatable with respect to the hinge 33; however, the openable/closable panel 31 does not need to be rotatable. For example, the openable/closable panel 31 may be fixed in the end portion of the document table 2a as shown in FIG. 15. Alternatively, the openable/closable panel 31 may be fixed in the lateral portion of the document feeding section 2b of the image reading device 2 as shown in FIG. 16. In the case of the structure shown in FIG. 15 or FIG. 16, the combination of the operation panel 5 and the mirror 32 is one embodiment of the display device or the input device of the present invention.

A display device of the present invention includes: a display section for simultaneously displaying (i) a first image in a first direction and (ii) a second image, which is different from the first image, in a second direction different from the first direction; and a reflecting section for reflecting the second image, which is displayed on the display section, toward a viewing position where the first image is viewable and recognizable. With this, in the viewing position, it is possible to view and recognize simultaneously both (i) the first image displayed on the display section and (ii) the second image reflected by the reflecting section.

Further, it is preferable that the reflecting section be a mirror viewable from the viewing position. This makes it possible that the second image displayed on the display section is reflected in the mirror, and that the second image reflected in the mirror are viewed and recognized in the viewing position. Further, a total display area in such a display device is equal to a total of (i) an area of a display screen of the display section and (ii) an area of a mirror surface of the mirror, so that a large total display area can be secured even in the case of a small display device.

Further, it is preferable to arrange the display device such that: the second image displayed on the display section is a mirror image of an image supposed to be presented to a viewer. With this, the second image reflected by the mirror (the second image reflected in the mirror) coincides with the image supposed to be presented to the viewer. Therefore, in the viewing position, the viewer can view and recognize not the mirror image but the image supposed to be presented in the first place.

Further, it is preferable to arrange the display device such that: an angle formed between a screen of the display section and a mirror surface of the mirror is adjustable. With this, a reflection angle of the mirror can be adjusted to be an angle suitable for the viewer's viewpoint (positions of eyes).

Further, it is preferable to arrange the display device such that: the mirror has a mirror surface that is as large as or larger than a screen of the display section. With this, the second image displayed on the display section can be entirely reflected by the mirror. This restrains such inconvenience that only a part of the second image displayed on the display section is reflected by the mirror.

It is preferable to arrange the display device such that: the second image presents information supplementary to information presented by the first image. With this, even when the first image is too small to present sufficient information, the first image and the second image are displayed simultaneously, so that sufficient information is presented to the user.

Note that it is preferable that the display device described above be used in a printing device. In this case, the display section is used as a touch screen of an operation panel of the printing device.

Further, an input device of the present invention includes: a touch screen for use in command inputting, and for simultaneously displaying (i) a first image in a first direction and (ii) a second image, which is different from the first image, in a second direction different from the first direction; and a reflecting section for reflecting the second image, which is displayed on the touch screen, toward a viewing position where the first image is viewable and recognizable. With this, in the viewing position, it is possible to view and recognize simultaneously both (i) the first image displayed on the touch screen and (ii) the second image reflected by the reflecting section.

Further, it is preferable to arrange the input device such that: the reflecting section is a mirror viewable from the viewing position. This makes it possible that the second image displayed on the touch screen is reflected in the mirror, and that the second image reflected in the mirror are viewed and recognized in the viewing position. Further, a total display area in such an input device is equal to a total of (i) an area of a screen of the touch screen and (ii) an area of a mirror surface of the mirror, so that a large total display area can be secured even in the case of a small touch screen.

Further, it is preferable to arrange the input device such that: each of the first and second images is an image indicating a menu presenting a plurality of selection items to be selected by a user. This makes it possible for the user to view and recognize simultaneously two types of image indicating a menu presenting a plurality of selection items to be selected by the user.

Further, it is preferable to arrange the input device such that: the touch screen has (i) a first region that accepts a user's touching operation carried out with respect to the touch screen so as to select a selection item presented by the first image, and (ii) a second region that accepts a user's touching operation carried out with respect to the touch screen so as to select a selection item presented by the second image, and the selection items presented by the first image are positioned within an area overlapping with the first region and the selection items presented by the second image are positioned within an area overlapping with the second region. This makes it possible to avoid such inconvenience that a position to be touched to select a selection item presented by the first image coincides with a position to be touched to select a selection item presented by the second image.

Further, it is preferable to arrange the input device such that: the mirror is covered with a touch panel, the first image presents a plurality of selection items to be selected by a user's touching operation with respect to the touch screen, and the second image presents a plurality of selection items to be selected by a user's touching operation with respect to the touch panel. This makes it possible for the user to view and recognize simultaneously both (i) the first image displayed on the touch screen and (ii) the second image reflected by the mirror (second image reflected in the mirror), when the user is positioned in the viewing position. Moreover, each selection item presented by the first image displayed on the touch screen can be selected by touching the touch screen, and each selection item presented by the second image reflected in the mirror can be selected by touching the touch panel covering the mirror.

Further, it is preferable to arrange the input device such that: an angle formed between the touch screen and a mirror surface of the mirror is adjustable. With this, a reflection angle of the mirror can be adjusted to be an angle suitable for the viewer's viewpoint (positions of eyes).

Note that it is preferable that the input device described above be provided in an electric device. The electric device may be any electric device including an input device having a touch screen. Examples of such an electric device include a printing device such as an MFP, a fax, a car navigation system, an ATM, various types of automatic vending machine, and the like.

The display device of the present invention is suitable for an operation panel including a touch screen, but is not limited to this. The display device of the present invention is applicable to any device having a display screen, such as a home-use television and a personal computer. Further, the input device of the present invention is suitable for an operation panel of an MFP, but is not limited to this. The input device is applicable to an operation panel of various types of electric device. Examples of such an electric device include a fax, a car navigation system, an ATM, and various types of automatic vending machine.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:
1. A printing device comprising a display device,
said display device, including:
a display section for simultaneously displaying (i) a first image in a first direction and (ii) a second image, which is different from the first image, in a second direction different from the first direction; and
a reflecting section for reflecting the second image, which is displayed on the display section, toward a viewing position where the first image is viewable and recognizable,
the display section being provided as a touch screen of an operation panel of the printing device.

2. An input device, comprising:

a touch screen for use in command inputting, and for simultaneously displaying (i) a first image in a first direction and (ii) a second image, which is different from the first image, in a second direction different from the first direction; and a reflecting section for reflecting the second image, which is displayed on the touch screen, toward a viewing position where the first image is viewable and recognizable.

3. The input device as set forth in claim 2, wherein:

the reflecting section is a mirror viewable from the viewing position.

4. The input device as set forth in claim 3, wherein:

each of the first and second images is an image indicating a menu presenting a plurality of selection items to be selected by a user.

5. The input device as set forth in claim 4, wherein:

the touch screen has (i) a first region that accepts a user's touching operation carried out with respect to the touch screen so as to select a selection item presented by the first image, and (ii) a second region that accepts a user's touching operation carried out with respect to the touch screen so as to select a selection item presented by the second image, and the selection items presented by the first image are positioned within an area overlapping with the first region and the selection items presented by the second image are positioned within an area overlapping with the second region.

6. The input device as set forth in claim 4, wherein:

the mirror is covered with a touch panel, the first image presents a plurality of selection items to be selected by a user's touching operation with respect to the touch screen, and the second image presents a plurality of selection items to be selected by a user's touching operation with respect to the touch panel.

7. The input device as set forth in claim 2, wherein:

an angle formed between the touch screen and a mirror surface of the mirror is adjustable.

8. An electric device comprising an input device, said input device, including:

a touch screen for use in command inputting, and for simultaneously displaying (i) a first image in a first direction and (ii) a second image, which is different from the first image, in a second direction different from the first direction; and a reflecting section for reflecting the second image, which is displayed on the touch screen, toward a viewing position where the first image is viewable and recognizable.

* * * * *